US010741090B2

(12) United States Patent
Nichols

(10) Patent No.: US 10,741,090 B2
(45) Date of Patent: Aug. 11, 2020

(54) SYSTEM AND METHOD FOR REINFORCING PROFICIENCY SKILL USING MULTI-MEDIA

(71) Applicant: Cross Braining LLC, Pleasant Lake, MI (US)

(72) Inventor: William Joshua Herron Nichols, Pleasant Lake, MI (US)

(73) Assignee: CrossBraining, Inc., Pleasant Lake, MI (US)

( * ) Notice: Subject to any disclaimer, the term of this patent is extended or adjusted under 35 U.S.C. 154(b) by 0 days.

(21) Appl. No.: 16/293,842

(22) Filed: Mar. 6, 2019

(65) Prior Publication Data

US 2019/0279521 A1 Sep. 12, 2019

Related U.S. Application Data

(60) Provisional application No. 62/639,013, filed on Mar. 6, 2018.

(51) Int. Cl.

| | |
|---|---|
| ***G09B 5/06*** | (2006.01) |
| ***G11B 27/031*** | (2006.01) |
| ***G11B 27/19*** | (2006.01) |
| ***H04N 5/92*** | (2006.01) |
| ***H04N 5/77*** | (2006.01) |
| ***H04N 9/802*** | (2006.01) |
| *G06F 3/0486* | (2013.01) |

(52) U.S. Cl.

CPC ............ *G09B 5/065* (2013.01); *G11B 27/031* (2013.01); *G11B 27/19* (2013.01); *H04N 5/772* (2013.01); *H04N 5/9202* (2013.01); *H04N 9/802* (2013.01); *G06F 3/0486* (2013.01)

(58) Field of Classification Search

CPC ...... G09B 5/065; G11B 27/031; G11B 27/19; H04N 5/772; H04N 5/9202; H04N 9/802; G06F 3/0486

USPC .......................................................... 386/282

See application file for complete search history.

(56) References Cited

U.S. PATENT DOCUMENTS 5,002,491 A 3/1991 Abrahamson et al.
6,239,793 B1 5/2001 Barnert et al.

(Continued)

FOREIGN PATENT DOCUMENTS

CN 106205243 A 12/2016

*Primary Examiner* — Thai Q Tran
*Assistant Examiner* — Nienru Yang
(74) *Attorney, Agent, or Firm* — Endurance Law Group PLC

(57) ABSTRACT

A novel system and method to implement a modified Learn-by-Teaching (LdL) method within a video-graphic context. The system and method include a narration step that is structured to cause the student or Group completing a Video Project to simultaneously engage different parts of the brain so as to work in concert to reinforce the proficiency skill being taught. During the narration step, the student must view a silent video while composing a textual script to serve as a voice-over narration. The student must then practice audibly reciting the script. The student is positively challenged during the narration step in two ways: achieve synchronicity with video, and to teaching an inanimate object in the form of an abstract audience of unknown scope. The combination of multi-modal actions and challenges facilitates implementation of a LdL method in a new and powerful way.

9 Claims, 6 Drawing Sheets

(56) References Cited

U.S. PATENT DOCUMENTS

| | | | | |
|---|---|---|---|---|
| 6,288,753 | B1 | 9/2001 | DeNicola et al. | |
| 7,369,808 | B2 | 5/2008 | Wessner et al. | |
| 9,626,875 | B2 | 4/2017 | Gal et al. | |
| 2003/0152904 | A1 | 8/2003 | Doty | |
| 2004/0009461 | A1 | 1/2004 | Snyder et al. | |
| 2006/0147891 | A1 | 7/2006 | Dreyfous et al. | |
| 2010/0238262 | A1* | 9/2010 | Kurtz | H04N 7/142 348/14.01 |
| 2011/0142420 | A1* | 6/2011 | Singer | G06Q 30/00 386/280 |
| 2013/0095464 | A1 | 4/2013 | Ediger et al. | |
| 2015/0371679 | A1* | 12/2015 | Oz | G06F 16/73 386/241 |
| 2016/0163212 | A1 | 6/2016 | Stuckey | |
| 2016/0253912 | A1 | 9/2016 | Heilman et al. | |

* cited by examiner

SYSTEM AND METHOD FOR REINFORCING PROFICIENCY SKILL USING MULTI-MEDIA

CROSS REFERENCE TO RELATED APPLICATIONS

This application claims priority to Provisional Patent Application U.S. 62/639,013 filed on Mar. 6, 2018, the entire disclosure of which is hereby incorporated by reference and relied upon.

BACKGROUND OF THE INVENTION

Field of the Invention

The invention relates generally to pedagogical methods, and more particularly to an improved method of reinforcing proficiency skills in a specified topic by teaching to an inanimate object through repetitive multi-modal cognitive stimulation using staged performances in combination with a multi-media system.

Description of Related Art

Pedagogy is commonly understood as the approach one takes to the act of teaching. Pedagogy can refer generally to the theories and practices of education as a discipline. The approach one teacher may take to exchange knowledge and skills in an educational context may vary greatly from another teacher, as pedagogy reflects the different social, political and cultural contexts from which they emerge.

Conventional western pedagogies have long viewed the teacher as knowledge holder and student as the knowledge receiver. However, there is an emerging trend to modify these traditional perspectives by identifying the student in terms of an agent of learning and the teacher as a facilitator of learning. Along these lines, learning by teaching (sometimes abbreviated "LdL" from the German Lernen durch Lehren) is a method of teaching in which students are made to learn material and prepare lessons to teach to others.

While the method of having students teach other students has been practiced for centuries, Jean-Pol Martin systematically developed the concept in 1980s in the context of foreign language learning. The LdL method eventually became widely used in Germany in secondary education. After preparation by the teacher, students are placed into small groups and become responsible for their own learning and teaching on an assigned topic.

Part of the success of the LdL method may be attributed to the practice of encouraging students to creatively discover ways to teach the material to the others. Side benefits of the LdL method include teaching students respect for others group-oriented settings, planning, problem solving and communication skills.

One variation of the LdL method has been referred as plastic platypus learning or the platypus learning technique. The platypus learning technique is based on evidence that suggests teaching an inanimate object improves understanding and knowledge retention of a subject. The characterizing feature of the platypus learning technique is that the student teaches the subject to an inanimate object. Of course, this technique is expected to work with any inanimate object and not only plastic platypuses.

There is a continuing need to perfect pedagogical techniques so as to improve the practices of education as a discipline. In modern society, video-graphic content has acquired a dominate share of attention for many students. It would be beneficial to adapt the LdL methods to a video-graphic content basis. It would also be beneficial to improve upon current and known LdL techniques through the application of the video-graphic arts.

BRIEF SUMMARY OF THE INVENTION

The invention contemplates a system and a method for reinforcing proficiency skills of a specified topic by teaching to an inanimate object through repetitive multi-modal cognitive stimulation using staged performances in combination with a multi-media system. The method comprises several steps, which include curating at least first and second Video Vignettes. The step of curating the first Video Vignette comprises designating at least a portion of raw video content as first Vignette Clips, disassociating any native audio content from the first Vignette Clips to create a first Soundless Preview, composing a first narration script for the first Soundless Preview, playing the first Soundless Preview on a Graphic User Interface while concurrently displaying the first narration script and reading aloud the first narration script, and storing in a non-transitory storage medium an audio recording of the first narration script in synchronicity with the first Soundless Preview to create a Narrated First Video Vignette. The step of curating the second Video Vignette is similar to the first, and includes designating at least a portion of raw video content as second Vignette Clips, disassociating any native audio content from the second Vignette Clips to create a second Soundless Preview, composing a second narration script for the second Soundless Preview, playing the second Soundless Preview on a Graphic User Interface while concurrently displaying the second narration script and reading aloud the second narration script, storing in a non-transitory storage medium an audio recording of the second narration script in synchronicity with the second Soundless Preview to create a Narrated Second Video Vignette. Finally, the Narrated First Video Vignette and the Narrated Second Video Vignette are aggregated or compiled to create a completed Video Project.

According to the systems and methods of this invention, the learn by teaching (LdL) method is adapted for implementation within a video-graphic context to facilitate teaching to an inanimate object—namely an abstract future audience. The adaption of the LdL methods to the video-graphic arts enables certain new and highly beneficial improvements over current and known LdL techniques. In particular, the basic principles of this invention enable a student to teach a subject to the imaginary construct of a future audience in combination with repetitive multi-modal cognitive stimulations. As a prerequisite, the student is required to stage and video-record live-action performances. The invention then requires the student to curate at least two Video Vignettes taken from the live-action video recordings.

By disassociating native audio content (if any) from the Vignette Clips, the student views only the visual content (i.e., the Soundless Preview) thereby concentrating the part of the brain that seeks to interpret images in much the same way as a hearing-impaired person. The student must then cognitively devise a narrative to explain the silent images to an imagined future audience (e.g., a teacher, other students, parents, relatives, etc.) When the student imagines that the future audience could include people unfamiliar with the subject (e.g., a grandparent), they are motivated to create a more meaningful explanation of the subject than may otherwise have been the case if interacting only with the class teacher. The narration is first composed in the form of a textual narration script, and then spoken aloud concurrently with the Soundless Preview displayed on a Graphic User Interface. Textual authorship activates different areas of the human brain from reading and hearing. By composing, seeing and hearing the narration in combination with seeing a Soundless Preview of the video content, the student's brain is stimulated in multiple different ways or modes. This multi-modal cognitive stimulation is reinforced through repetition, hence the requirement to complete at least two Video Vignettes. Finally, to create a completed Video Project, the plural Video Vignettes are aggregated to run end-to-end for grading and presentation to unspecified audiences.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Referring to the figures, wherein like numerals indicate like or corresponding parts throughout the several views, a system and a method for reinforcing proficiency skills in an assigned topic is illustrated in various ways. The system will comprise any suitable platform, including a computer server or stand-alone computing device along with peripheral devices as described below. The computing device is of the type that includes a non-transitory computer readable medium coded with instructions and executed by a processor to perform the steps of the method. According to the methods of this invention, the learn by teaching (LdL) method is adapted for implementation within a video-graphic context to facilitate teaching to an inanimate object—namely an abstract or imagined future audience of indeterminate scope. The adaption of the LdL methods to the video-graphic arts enables certain new and highly beneficial improvements over known LdL techniques. In particular, the basic principles of this invention enable a student to teach a subject to the imaginary construct of a future audience in combination with repetitive multi-modal cognitive stimulations.

Figure 1:
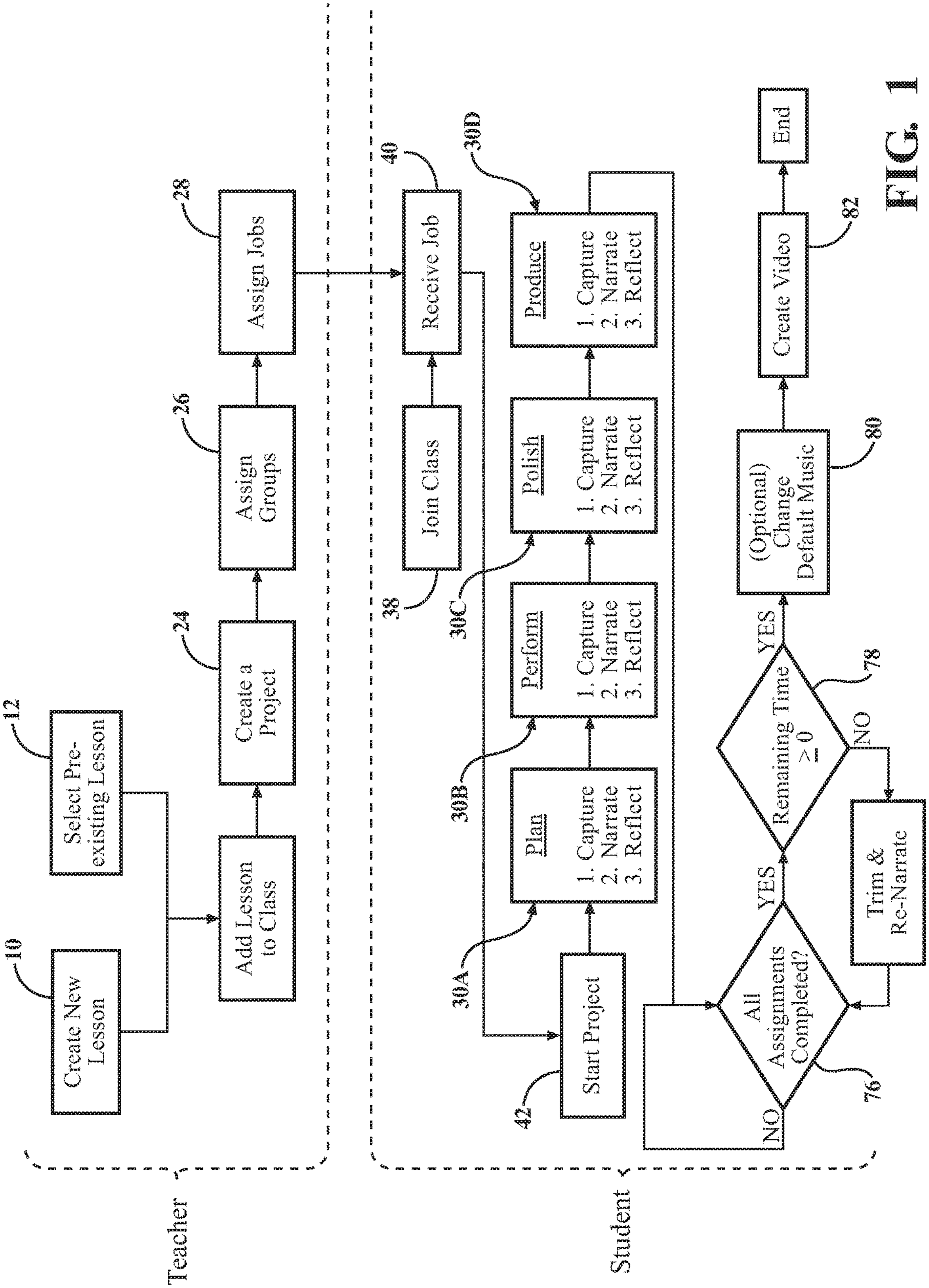
FIG. 1 is a schematic diagram showing a method according to an exemplary embodiment of the present invention.

FIG. 1 provides an overview of an application of this invention within the traditional (or virtual) classroom environment. It should be understood, however, that the salient principles of this invention are readily adaptable to non-traditional learning environments, and further include but are not limited to adult education, continuing professional education, workplace training, industrial quality control, and the like. The following explanation of the invention is presented in the context of a K-12 classroom setting, although this must be understood as an expedient but non-limiting example.

The term "teacher" is used throughout to represent any person or group of persons responsible to facilitate the education of a student. The term "student" is used throughout to represent any person or group of persons responsible to learn a subject or topic or skill through the video-graphic methods of this invention.

Referring still to FIG. 1, a prerequisite base Lesson is either created from scratch, as indicated at function block 10, or selected from a library of pre-existing Lessons 12. The library of pre-existing lessons 12 can reside within the private archives of the teacher, e.g., saved on a local hard drive, or within the shared archives of a group or association or in the public domain. A Lesson is a prospective Project, somewhat in the way an experiment described in a book may serve as a template for an actual implementation of the exercise in a classroom, in that a teacher may decide to follow the experiment described in a book to the letter without deviation or may modify the book description to suit their immediate needs. Similarly, a teacher may adopt and implement a Lesson verbatim, or modify the Lesson to suit the class. Thus, as used herein, a Project (or Project Video) is an implementation of a Lesson. The Lesson serves as a guide for a Project. At the discretion of the teacher, a Project may either follow a Lesson exactly or deviate from a Lesson.

Figure 2:
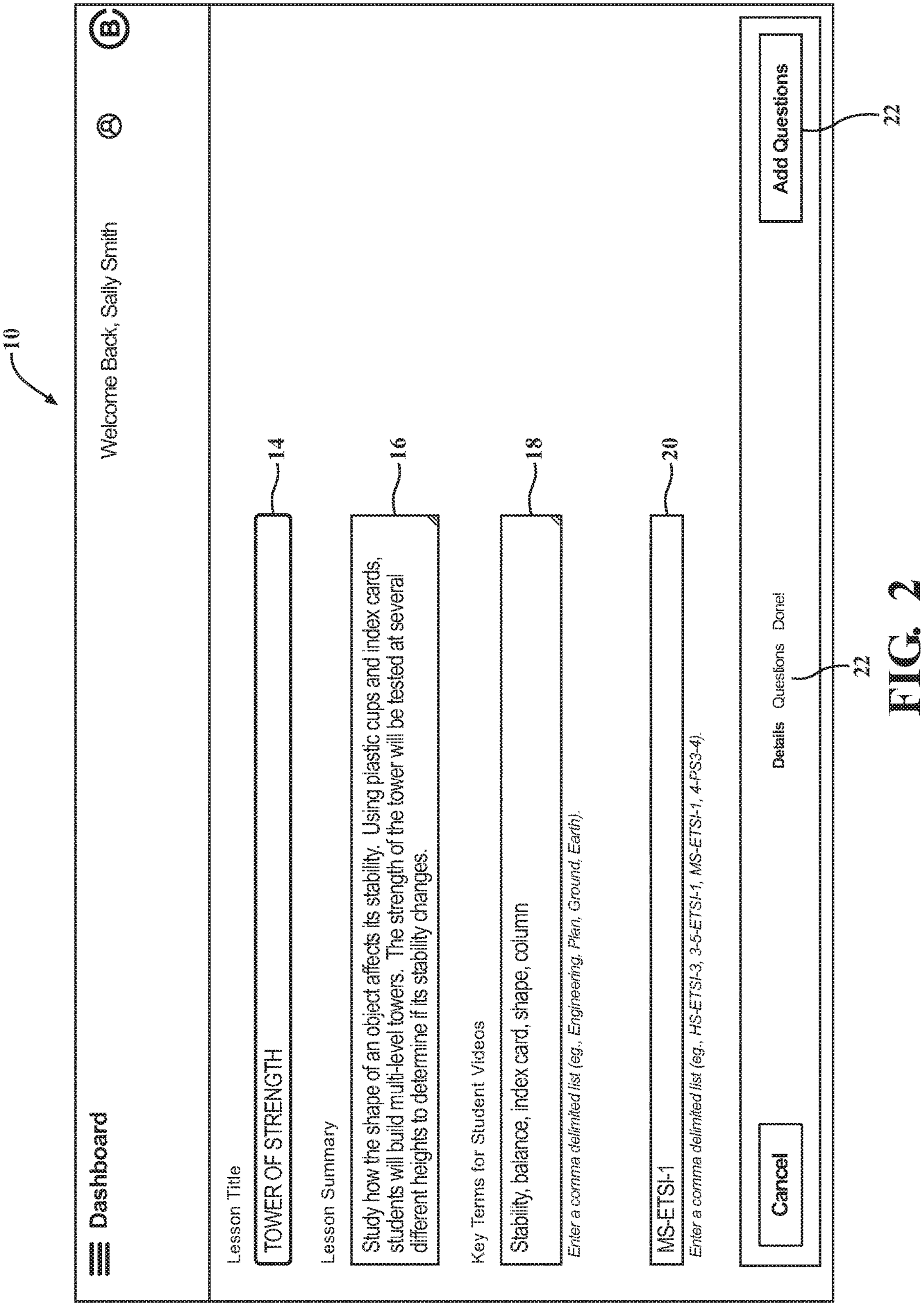
FIG. 2 is a representative screen shot of the interface used by a teacher to create a Video Project according to the exemplary embodiment.

When creating a new Lesson 10, a Details interface may be provided like that shown in FIG. 2. Typically, a Lesson will be given a unique title 14, such as TOWER OF STRENGTH, or MARSHMALLOW CHALLENGE, etc. It will be helpful to provide a Lesson Summary 16 that will inform other Library users in search of a new Lesson and also provide a suggested summary of Project scope and implementation for prospective students. Each Lesson should be populated with one or more Key Terms 18 that a prospective student will be required to master in connection with a Project. Key Terms 18 will be those determined by the teacher and/or mandated by a relevant Standard. Relevant Standards, if any, are recorded in field 20. By associating specific Standards 20 with a Lesson, powerful data can be generated to track compliance by class, school, district, county, state, etc.

Another basic Detail that can be established by the teacher for each Lesson is a Max Run Time. This is the total running time permitted for a Project Video based on the Lesson. In practice, 45 seconds has been found to be a generally satisfactory Max Run Time for the majority of Video Projects assigned at the K-12 level. However, the teacher creating a Lesson may determine that a longer or shorter Max Run Time is more desirable.

Once the basic Details about a new Lesson have been documented (FIG. 2), the teacher will proceed to drafting Questions 22. A screen interface for the Questions 22 is not shown, but will be easily comprehended by those of skill in this art. The purpose of Questions 22 is to require specific responses from the students at various stages of the Project during a time referred to as Reflect, or the Reflect Job (36 in FIG. 3). A student's (or Group's) response to each Question will enable the teacher to assess that student's comprehension of the subject, or compliance with a meaningful action. The Question could be any form of task, including a request to provide information, to comment on a topic, to perform some action, or the like. The teacher is given wide-ranging latitude to devise Questions suitable to the students.

Returning again to FIG. 1, once a suitable Lesson has been chosen or created the teacher will add that Lesson to a Class for which they are responsible (e.g., 4$^{th}$ Hour Chemistry) and use the Lesson to create a Project 24 (also referred to herein as a Video Project 24). In creating the Project 24, the teacher may at this stage modify any of the Lesson Details (e.g., Title, Key Terms, Standards, Max Run Time, etc.) and/or Questions to customize the Lesson for the intended class. Thus, a Project 24 (or Video Project 24) is a Lesson that has been chosen for a particular class assignment, and which optionally may have been modified to suit the circumstances.

Next, the teacher will assign some or all of the students in the class into Groups, as indicated at function block 26. This step of assigning Groups 26 can be accomplished in any convenient manner and with great flexibility. The total number of Groups and/or number of students in a Group can be controlled by the teacher. The system can be programmed to randomly assign students into the available Groups. Or, the teacher can manually assign students into specific Groups (such as when students are permitted to self-organize into Groups of choice). Or in a hybrid scenario that teacher may manually assign some students to a Group(s) and allow the system to randomly assign the others.

When students have been assigned to Groups for the purpose of completing an assigned Video Project 24, the teacher must next assign Jobs 28. To understand this step, it will help to provide an overview of the unique organizational structure of a Video Project 24 according to this invention. In particular, each Project 24 is composed of a plurality of phases, referred to hereafter as Video Vignettes. The Video Vignettes are each generally indicated at 30, and distinguished from one another by suffix letters A, B, C, D, . . . n. The total number of Video Vignettes 30 is at least two (i.e., 30A and 30B) but in practice can be any number greater than one. Best results have been achieved when the number of Video Vignettes 30 is between three and five. The illustrated examples contemplate four Video Vignettes 30A-D, which are also identified by the exemplary phase titles Plan, Perform, Polish and Produce, respectively. These phases could alternatively be titled Hypothesis, Evidence, Evidence, Conclusion, or perhaps Claim, Evidence, Evidence, Reasoning, or simply Phase 1, Phase 2, Phase 3 and Phase 4.

Preferably, but not necessarily, each Video Vignette 30 follows a similar format in terms of Jobs to be performed. The total number of Jobs within each Video Vignettes 30 is at least one (Narrate 34), but in practice can be any number. Best results have been achieved when the number of Jobs is three—namely Capture 32, Narrate 34 and Reflect 36. The Jobs in one Video Vignette 30 are distinguished from the same Jobs in the other Video Vignettes 30 by the same aforementioned suffix letters A, B, C, D, . . . n. In the illustrated examples, all Jobs in the Plan phase Video Vignette 30A carry an "A" suffix, all Jobs in the Perform phase Video Vignette 30B carry a "B" suffix, and so forth. Thus, a reference to Capture 32C pertains to the Capture Job within the Polish phase Video Vignette 30C.

The assign Jobs step 28 requires the teacher to associate specific students in each Group to specific Jobs 32-36 for each Video Vignette 30A-D. Every Job 32-36 must have a responsible student owner. It is possible that one or more students in a Group will have multiple Job assignments for the entire Project 24. This step of assigning Jobs 32-36 can be accomplished in any convenient manner and with great flexibility. The system can be programmed to randomly assign Jobs to students in the Group, or the teacher can manually assign Jobs 32-36, or a hybrid scenario can be employed. In practice, it has been found expedient, and even beneficial, to randomly assign responsibilities for completion of Jobs 32-36, but give students the freedom to delegate amongst themselves within the Group. This has been found to teach the ancillary skills of work group ethics and etiquette, as well job responsibility and managerial practices. Because individual students are assigned Jobs 32-36, but in fact the Group must satisfy Job completion, the following descriptions may at times use the terms student and Group interchangeably.

Students enter into the system through which the Project 24 is assigned by joining a class, as at function block 38. This join class step 38 would typically occur once per duration of the teacher-student relationship within the context of the given class (e.g., 4$^{th}$ Hour Chemistry). That is to say, a student would not normally be required to join class 38 for the second and subsequent projects 24 assigned by the same teacher in that same class environment (e.g., 4$^{th}$ Hour Chemistry).

A student's first exposure to a new Project 24 may be when they receive notice of their Job or Jobs 32-36 for that Project 24, as indicated at function block 40. From the perspective to the student, the Video Project 24 is now ready to commence, as per function block 42. The system may be configured to require each Group to accept their Job assignments as a condition to advancing in the Project 24. Prior to acceptance, at the teacher's discretion, students by be permitted to re-allocate Job assignments within the Group. A teacher may permit re-allocation as a means to foster communication within the Group.

As previously mentioned, this present invention is constructed around a video-graphic framework. A teacher-specified plurality of Video Vignettes 30 must be completed in order to satisfactorily complete the entire Video Project 24. And within each Video Vignette 30, there is a series of Jobs 32-36. FIG. 2 graphically lays out three exemplary Jobs as: Capture 32, Narrate 34 and Reflect 38.

Figure 4:
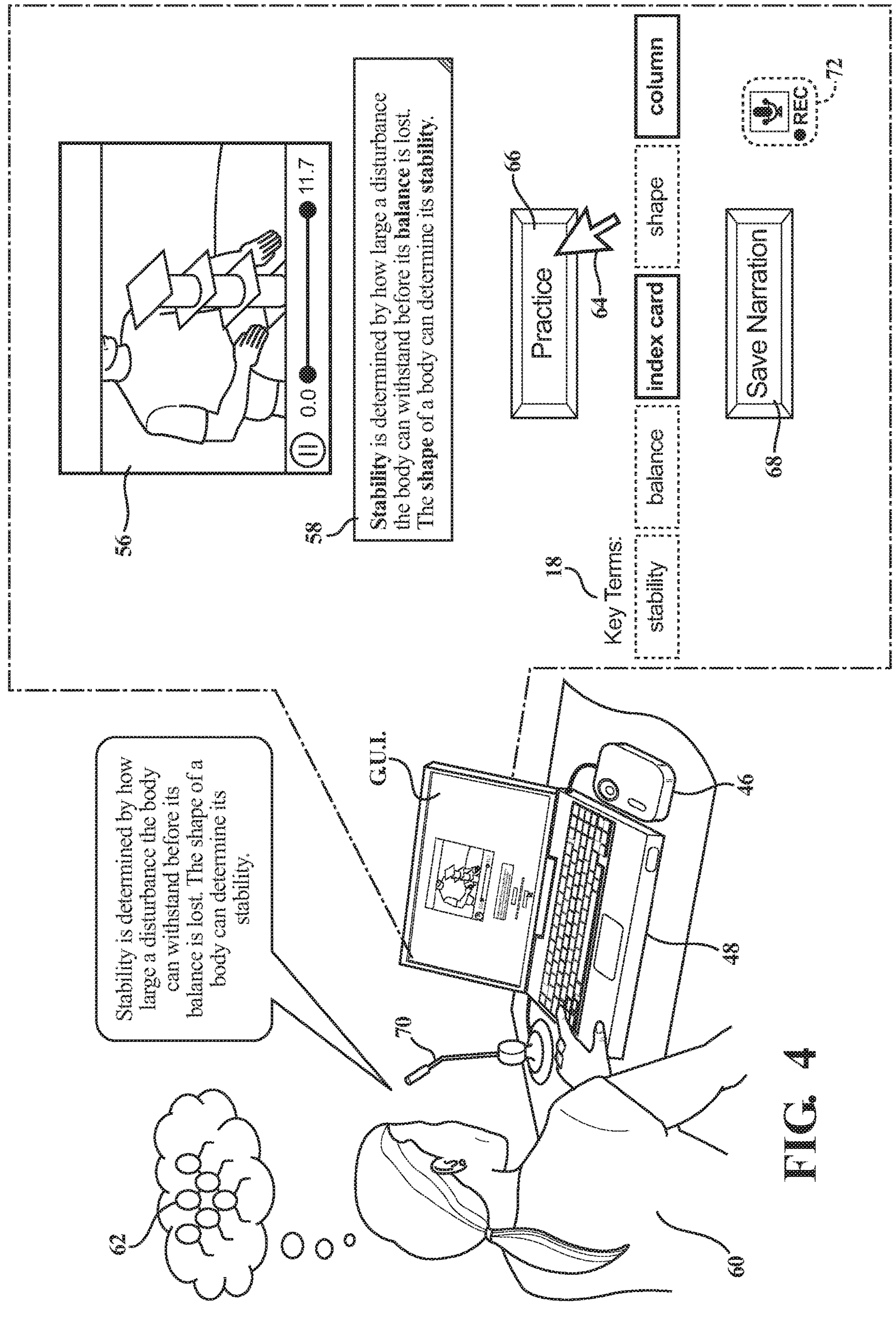
FIG. 4 depicts a student interacting with a Graphic User Interface and a microphone and a video camera to learn by teaching an assigned topic to an inanimate object through repetitive multi-modal cognitive stimulation.

The first Job, Capture 32, refers to both the requisite staging and recording of a live-action performance in order to acquire raw video content, as well as the curating of selected clips suitable for inclusion in the Video Project 24. Function block 44 represents the Group requirement to video-capture live-action events using a suitable video camera 46 (FIG. 4). Preferably, the video camera device 46 will be configured with a non-transitory camera storage medium onto which the recording can be stored. Most modern video cameras 46 will provide accommodation for some form of digital storage medium, such as a flash memory card or the like. Using such a video camera 46, the students will generate a live-action video-recording of a staged (i.e., pre-planned and executed) live-action performance of relevance to the assigned topic. The raw video content will be stored directly on the camera storage medium.

Still operating under the Capture Job 32, the raw video content is transferred from the camera storage medium to a non-transitory WIP Storage Medium which may, for example, be a memory storage device contained in or otherwise associated with a general-purpose computer 48 (FIG. 4). This step is represented by the Upload function block 50 in FIG. 3. The WIP (i.e., Work-In-Process) storage device could be the hard drive within the computer 48, or a removable memory device (e.g., flash drive or external hard drive), or a remote data storage system accessed through an internet connection. These are only suggested as examples; indeed, other suitable WIP Storage Medium options may exist. Generally, it is preferred to transfer (Upload 50) the raw video content away from the camera storage medium to provide a degree of Project 24 security and protection against loss/damage of valuable video footage. In FIG. 4, the video camera 46 is shown electrically connected to the computer 48 via a cable, through which the raw video recording may be transferred. Alternatively, if the camera storage medium is a removeable data card, the Upload 50 can be accomplished by temporary relocation of the memory card into union with the computer 48 of via a wireless connection like WiFi or Bluetooth®.

Still operating under the Capture Job 32, the raw video content is trimmed at Trim step 52. Trim step 52 is the process of designating at least a portion of the raw video content to serve as usable Vignette Clips. The plural form of Clips is not intended to preclude use of a single uninterrupted section of video recording. Thus, the trim step 52 is a gleaning process where the choicest portions of the raw video content are selected as likely candidates to appear in the final completed Video Project 24. In selecting which portions of video content are suitable for use as Vignette Clips, the student(s) must imagine themselves teaching the Project Lesson to an imagined future audience. Thus, the student's brain is forced to contemplate "What is needed to visually explain this phase of the Project 24 to an anonymous person?" rather than the traditional cognitive assessment "Do I personally understand this phase of the Project 24?" The former question naturally compels the student to answer the latter question in the affirmative, and then to re-package the information even more thoughtfully for the general consumption of some unspecified audience that would include a broader audience than just the teacher.

The students' curated set of Vignette Clips will naturally have a run time. That is, the time required to watch the Vignette Clips for any phase (30A-D) will require an amount of time or lapsed time viewing period. This viewing period is the run time for the Vignette Clips. The sum total of run times for all Vignette clips for all phases (30A-D) is an Unfinished Project Run Time. Said another way, the time required to watch all of the Vignette clips for all phases (30A-D) back-to-back is the Unfinished Project Run Time. The Unfinished Project Run Time is a relatively important feature of this invention, because it is used to calculate and report the Remaining Time available for the entire Video Project. The mathematical difference between the Max Run Time and the Unfinished Project Run Time is reported to the Group as Remaining Time at function block 54 in FIG. 3. In an example, if the Max Run Time is 0:45:000 (45 seconds) and the instantaneous Unfinished Project Run Time is 0:31:150, a Remaining Time of 0:13:850 is reported at function block 54. The Group knows, in this example, that it has 13 seconds, 850 milliseconds remaining to complete the Video Project 24. In another example, the Max Run Time is 0:45:000 but the instantaneous Unfinished Project Run Time is 0:51:442. A Remaining Time of −0:06:442 is reported at function block 54. The Group knows, in this second example, that it has exceeded the allotted time by 6 seconds, 442 milliseconds so that additional trimming (Trim 52) is required to bring the Video Project 24 into compliance with the Max Run Time specification. These are very basic examples. In actuality, the degree of accuracy to which the time is computed (e.g., in whole second or milliseconds, etc.) is subject to design choice by the system and/or by the teacher.

For the initial Video Vignette 30A at the beginning of a Project 24, i.e., during the first effort to complete the Plan phase 30A, the run time for the Vignette Clips will be equal to the Unfinished Project Run Time because at that early stage there are no other Vignette Clips. However, at the second Perform phase (Video Vignette 30B), the Unfinished Project Run Time will be the sum of the run times for Vignette Clips from both phases 30A and 30B. At the third Polish phase (Video Vignette 30C), the Unfinished Project Run Time will be the sum of the run times for Vignette Clips from phases 30A, 30B and 30C. And finally, at the fourth Produce phase (Video Vignette 30D), the Unfinished Project Run Time will be the sum of the run times for Vignette Clips from phases 30A, 30B, 30C and 30D saved in the WIP Storage Medium. For a Max Run Time of 0:45:000, this computes to an average of 0:11:250 seconds per phase. However, in practice each phase is likely have a slightly different run time. As stated previously, if the Group was not attentive to the Unfinished Project Run Time and allowed themselves to surpass the Max Run Time, they must alter the Unfinished Project Run Time by re-trimming one of more of the Vignette Clips saved in the WIP Storage Medium. The system will not validate a completed Video Project 24 if its Unfinished Project Run Time is greater than the Max Run Time.

Returning to FIG. 3, the Vignette Clips from any given phase (30A-D) are assembled at function block 56. The assembling term contemplates that the trimming step 52 may have resulted in numerous time-separated portions of raw video recording that the Group has selected to satisfy that phase, and these discrete video snippets must be stitched together into a continuous running stream. However, the term "assembling" is not intended to preclude the possibility that a single continuous portion of uninterrupted raw video recording could be selected as the exclusive representative for Vignette Clips to satisfy a phase. Either in conjunction with the assemble video clips step 56, or at some point prior, any native audio content captured with or attached to the raw video recording must be disassociated from the Vignette Clips, so that a Soundless Preview is produced by the assemble video clips step 56. The Soundless Preview 56 is the assembled Vignette Clips without audio—i.e., a short silent film. By disassociating native audio content (if any) from the Vignette Clips, the student views only the visual content (i.e., the Soundless Preview 56) thereby concentrating the part of the student's brain that seeks to interpret images in much the same way as a hearing-impaired person. The student must then cognitively devise a narrative to explain the silent images to an imagined future audience (e.g., a teacher, other students, parents, relatives, etc.)

In an extreme but nevertheless viable example, the teacher may omit the Capture 32 Job altogether by providing a Soundless Preview 56 to the Group or otherwise allowing the Group to acquire a pre-finished Soundless Preview 56 from an outside source. Thus, the Capture 32 Job is considered optional.

The next Job in the sequence is Narration 34. When the student realizes that the future audience could include people unfamiliar with the subject (e.g., a grandparent), they are naturally-motivated to create a more meaningful explanation of the subject than may otherwise have been the case if interacting only with the class teacher. Said another way, because the scope of the future audience cannot be defined with any certainty, the student receives unique motivation to craft more universal explanation. The Narration Job 34 is graphically-depicted in FIG. 4 as may appear on the Graphic User Interface (GUI) of the computer 48. The Group, represented in FIG. 4 by a single student 60, must first compose a script 58, in the form of a textual narration to accompany and explain the Soundless Preview 56 to an abstract audience 62. The script is shown as function block 58 in FIG. 3 and text entry field 58 in FIG. 4. In composing the script 58, the Group is required to use at least some of the Key Terms 18 specified by the teacher. As the system recognizes Key Terms 18 in the script 58, they are distinguished in some fashion. The Key Terms 18 are shown bolded in the example of FIG. 4, but other techniques could be employed with effectiveness. It is not necessary that the script 58 for one phase (e.g., for the Perform Video Vignette 30B) use all Key Terms 18 in its script 58B. It is only required that collectively among all scripts 58A-D all of the Key Terms 18 be used at least once. Conceivably, one script 58 may not include any Key Terms 18 yet all of the Key Terms 18 be used at least once in the other three scripts. The system can be configured to enable a "drag and drop" functionality so the student 60 can conveniently drag individual Key Terms 18 to the script field 58 using a cursor 64. The system can also be configured to indicate which Key Terms have been used and which remain unused by any convenient method. The example of FIG. 4 shows used Key Terms 18 in a light colored or semi-transparent font with broken outline.

The abstract audience 62 is the imagined but unspecified future audience (e.g., a teacher, other students, parents, relatives, etc.). This abstract audience 62 is the surrogate inanimate object (e.g., plastic platypus) of the prior art LdL technique. However, unlike an inanimate object the future imagined audience 62 has the power to judge the students' work. That power of judgement, or perhaps fear of embarrassment, serves to motivate a student better than an inanimate object. That is, the Group does not know how widely the Project Video 24 may eventually be distributed. For most students, factors such as personal dignity and peer pressure and sincerity are likely to motivate even more thoughtful narration content than might be produced by the traditional plastic platypus or other inanimate object.

Figure 3:
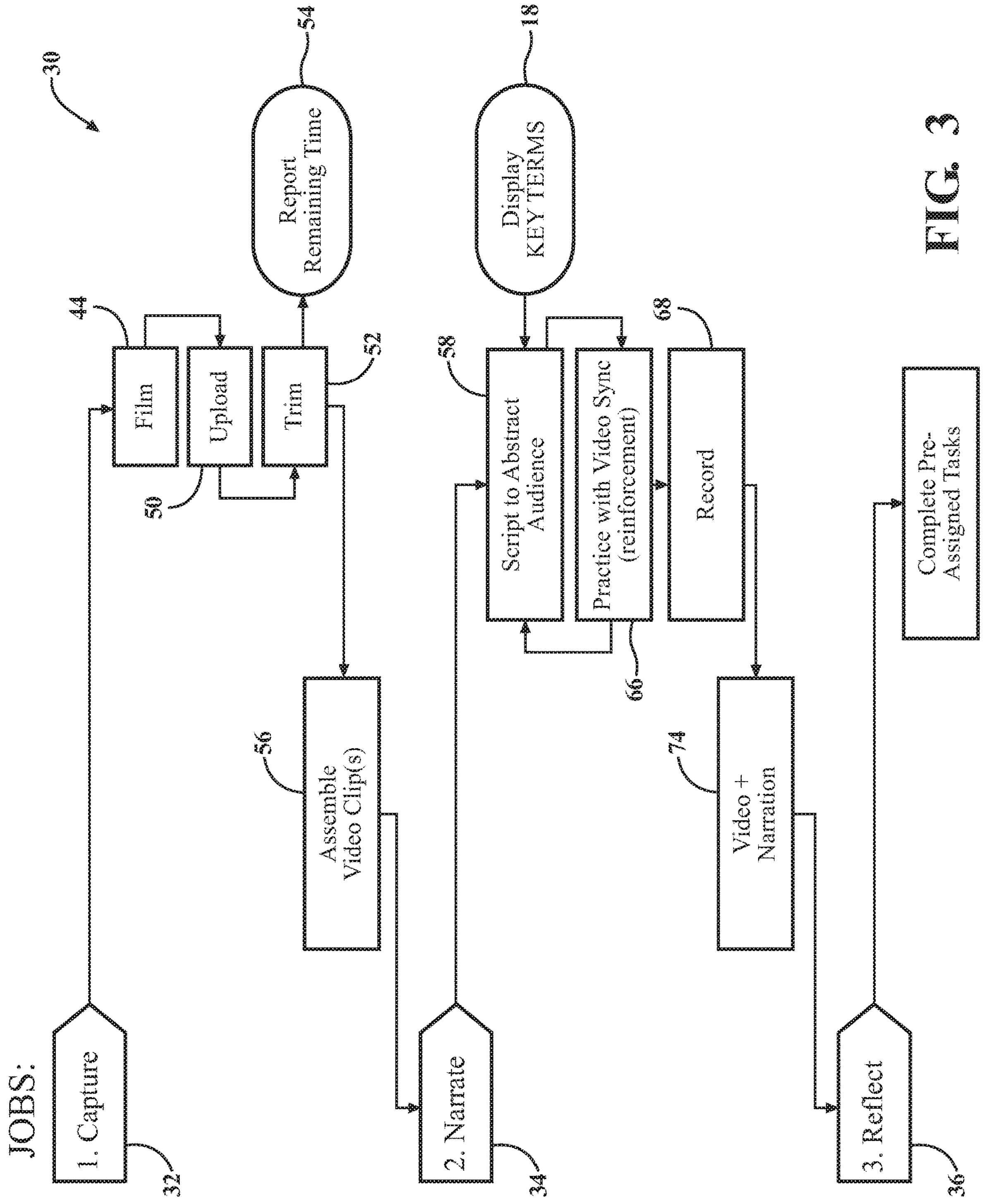
FIG. 3 is a schematic diagram showing a method detailing the various jobs to be fulfilled for each Video Vignette according to the exemplary embodiment.

Once the script 58 has been composed to the student's 60 initial satisfaction, they will practice the narration with synchronized video play, as indicated at function block 66 in FIG. 3. In FIG. 4, this is represented by the Practice Button 66, which is activated by cursor 64 via the GUI. Activating the Practice Button 66 causes the Soundless Preview 56 associated with the corresponding phase (30A-D) to play from beginning to end. Optionally, a count-down clock may be displayed before commencement of the Soundless Preview 56 to provide the speaker with an opportunity to collect their composure. The student uses the Practice session 66 to speak out-load the previously composed script 58. In FIG. 4, a speech bubble portrays the student 60 practicing the script 58 while viewing the Soundless Preview 56 on the GUI. Those of skill in this art will agree that that act of reading aloud stimulates different areas of the human brain from reading and textual authorship. By composing, seeing and hearing the narration script 58 in combination with seeing a Soundless Preview 56 of the video content, the student's brain is stirred in multiple different ways or modes. This multi-modal cognitive stimulation is reinforced through repetition, hence the requirement to complete at least two Video Vignettes 30.

The student 60 will repeat the Practice step 66 as many times as needed to perfect oratory, as well as to match the time span of the narration with the run time of the Soundless Preview 56. The student knows that the system and method will not permit the voice-over narration to be longer in length than the run time of the Soundless Preview 56. That is to say, the method and system will not initiate recording of the narration prior to initiation of play of the Soundless Preview 56, nor will it capture recording of the voice-over narration beyond when play of the Soundless Preview 56 ends. Thus, recording of the voice-over must always occur between the start and end times of the Soundless Preview 56. As a direct result, the method of this invention cleverly constructs a challenge for the student 60, in that they must fit the orated narration script to the Soundless Preview 56. If the fit is poor, the student must change the text, change the speed at which they speak, and/or re-trim the Soundless Preview 56. Managing these variables, the student 60 solves a complex puzzle. Such challenges and ancillary puzzle problems are known to heighten attention, increase interest and solidify memory in students. Thus, the system and method requirement to fit the narration script to the Soundless Preview 56 further contributes to the successful implementation and results of this invention.

When the student 60 is satisfied with their practiced narration performance, they will move on to the Record step 68. In FIG. 4, this Record step is represented by the Save Narration button 68. The student 60 activates the Record function by clicking the Save Narration button 68 with the cursor 64 via the GUI. Upon such activation of the Save Narration button 68, the Soundless Preview 56 begins to play from the beginning and a microphone 70 associated with the computer 48 is enabled to record sound in synchronized association with the Soundless Preview 56. Optionally, a small icon 72 may appear on the GUI to indicate a hot mic when the Save Narration button 68 is activated. The ability for the microphone 70 to record spoken sounds automatically terminates with the play of the Soundless Preview 56. At function block 74, the Soundless Preview 56 and recorded Narration are saved to the WIP Storage Medium in "as recorded" synchronicity. The student 60 can re-record the narration if not satisfied, otherwise the Group proceeds to Reflect Job 36.

The Narrate Job 34 has been particularly adapted to yield new and unexpected results in the Pedagogical arts. In pedagogical applications where the student 60 is made to reinforce their own individual proficiency skills by preparing a lesson to teach to others, there was not previously known an effective way to integrate the video-graphic arts that would reliably yield results better than could be achieved using more classical methods of student-led LdL. For example, any prior art uses of videography in the LdL context would not have yielded statistically-better results than mere live one-on-one or group presentations for the student to the audience. However, the Narrate Job 34 of this present invention has been uniquely structured to yield statistically-better results than the classical methods of student-led LdL. This is because the Narrate Job 34 orchestrates repetitive, multi-modal cognitive stimulation in the student 60. By requiring the student to use staged performances in combination with the disclosed multi-media system, proficiency skills in a specified topic can be more effectively reinforced by teaching to an inanimate object in the form of an abstract audience 62 of uncertain scope. The reinforcement aspect is achieved by requiring the student 60 to curate at least two (i.e., a plurality) of Video Vignettes 30. By disassociating any native audio content from the Vignette Clips, the student 60 is forced to view a Soundless Preview 56 in much the same way as a hearing-impaired person might view a video scene. Viewing a Soundless Preview 56 while imagining how to describe what the video represents to an unspecified future human audience sparks a new perspective in the student 60 by engaging otherwise an un-stimulated part of the brain. In addition, the student must compose a textual script 58 to serve as a voice-over narration of the Soundless Preview 56. The act of writing prose stimulates yet another part of the student's brain. Next, the student practices 66 speaking out-loud the composed script while concurrently viewing the Soundless Preview 56. This practicing step 66 combines elements of sight (seeing script 58 on GUI and seeing Soundless Preview 56), speech (speaking out loud), and sound (hearing themselves speak out-loud). All of these multi-modal stimulations are further enhanced and concentrated by the student's 60 effort to inform an abstract audience 62 and the challenge of time-fitting the narration to the run-time of the Soundless Preview 56. All of these factors work together—additively and synergistically—to reinforce the student's 60 own individual proficiency skills in the assigned topic. Additionally, the benefits of repetition are leveraged by insisting that at least a second narration occur to achieve a final recording (Save Narration 68).

For all of these reasons, the Narrate Job 34 enables the present invention to achieve surprising new results and unexpected advantages compared to all know prior art methods.

The Reflect Job 36 is shown following the Narrate Job 34, however its sequence is not necessarily restricted. While undeniably beneficial, the Reflect Job 36 is considered optional, in that a teacher may not assign a task for one or more of the Video Vignettes 30A-D. As shown in function block 76, the Group is required to complete the pre-determined tasks, if any, as a condition of completing that Video Vignette 30. The tasks come from the Questions 22 established by the Lesson and/or teacher when creating the Project 24. In many cases, the pre-determined task will be to answer a question, like "Described some things this Project taught you about friction?" or "Explain three ways to measure temperature." However, the pre-determined task could also require the Group to take some type of affirmative action, like "Submit your plan outline to Mrs. B." or "Ask five people outside of class what is their favorite color and record your observations in the Group Notebook." These are a few examples of the many different types of pre-determined tasks that could appear in the Reflect Job 36 stage. Once all pre-determined tasks (if any) are completed for a given Video Vignette 30, the Reflect Job 36 for that Video Vignette 30 is deemed to have been satisfied.

Figure 5:
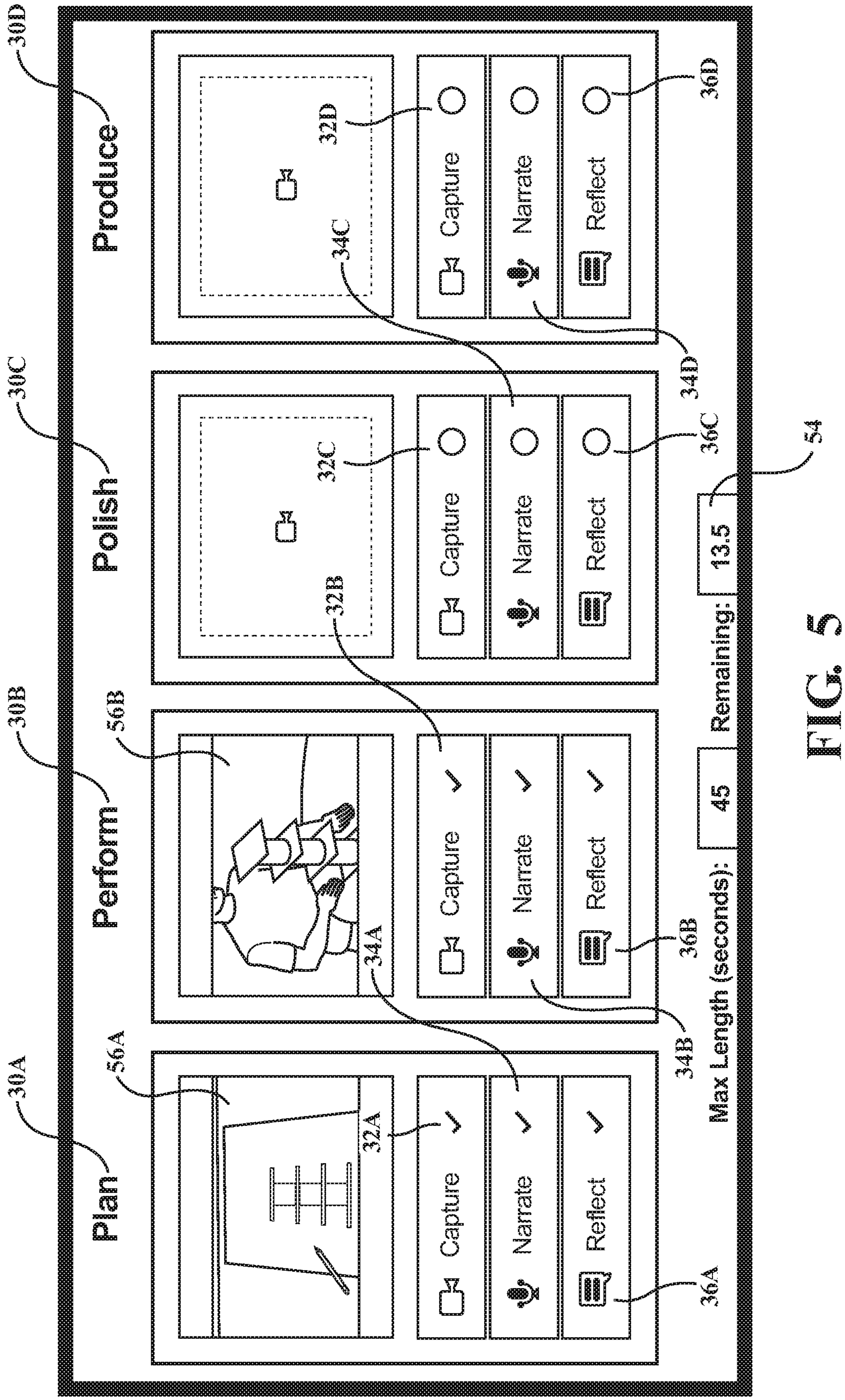
FIG. 5 is an exemplary diagram presented to a student/group showing the real-time completion status for an assigned Video Project in Storyboard fashion.
Figure 6:
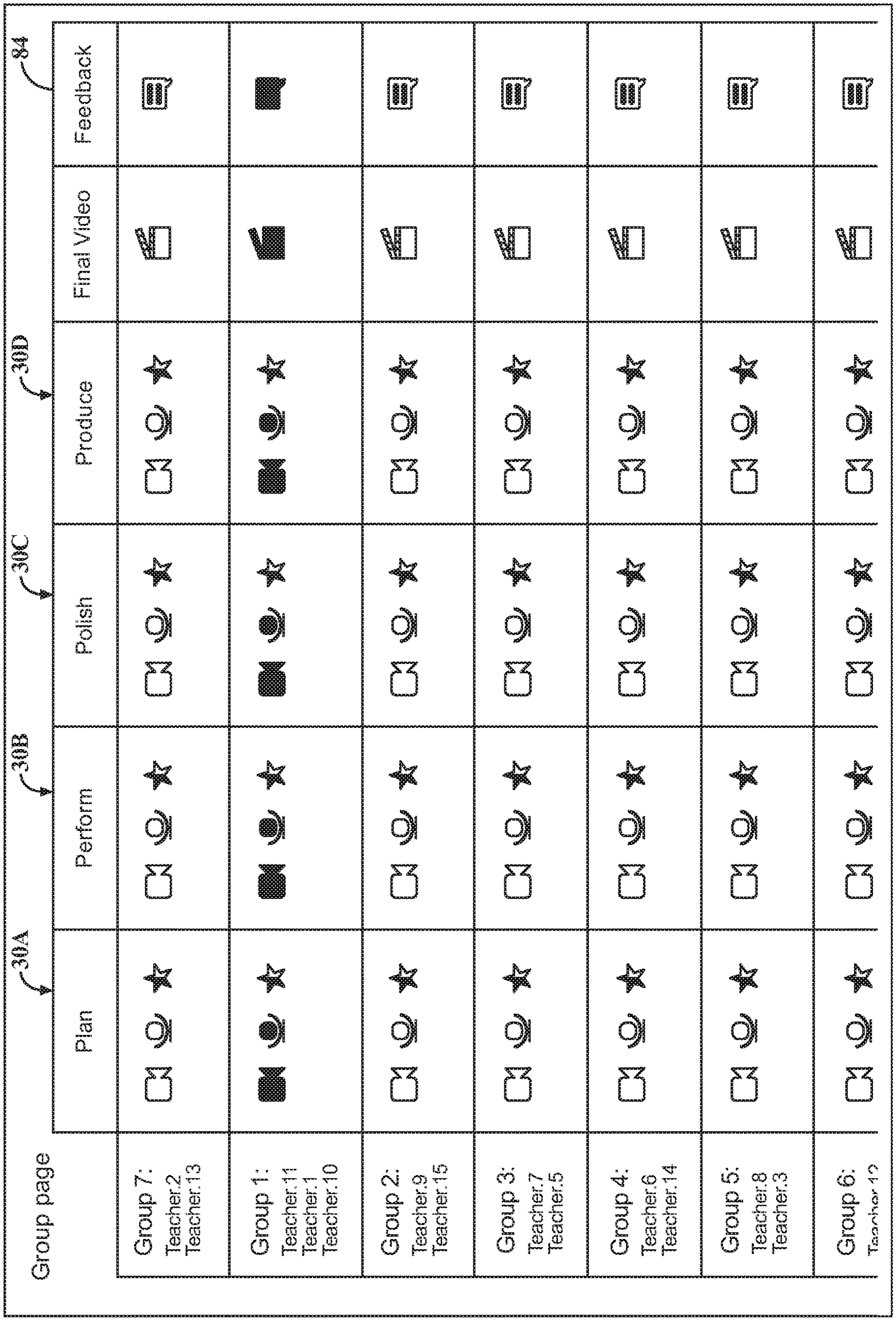
FIG. 6 is an exemplary diagram presented to a teacher showing the real-time Video Project completion status for a plurality of student groups in a class.

As previously stated, each Project 24 is composed of a plurality of Video Vignettes or phases 30. The minimum number of Video Vignettes 30 is two, but there is not a maximum number. For practical reasons, it is expected that most Projects 24 will have between three and five Video Vignettes 30, although four (A-D) is considered more or less idea for most topics. FIGS. 1, 5 and 6 contemplate four Video Vignettes 30A-D, identified by the exemplary phase titles Plan-Perform-Polish-Produce. FIG. 5 is an exemplary screen shot of a student computer 48 displaying the completion-status of the Video Project 24 in the form of a storyboard. In particular, each Video Vignette 30A-D is depicted in a respective column. Within each column, a thumbnail image captured from the Soundless Preview 56 (if any) appears at the top, under which appear an identifier or label representing the Jobs 32-36 for each phase. Completion status for the Jobs 32-36 is shown by check marks and open circles. In the example of FIG. 5, the Plan Video Vignette 30A is shown having been fully completed by check marks next to the Capture 32A, Narrate 34A and Reflect 36A labels. Likewise, the Perform Video Vignette 30B is also seen as fully completed by check marks next to its Capture 32B, Narrate 34B and Reflect 36B labels. However, this exemplary storyboard indicates that this Group has not completed any Jobs for either of the Polish 30C or Produce 30D Video Vignettes. This indication is evident by the open circles next to the respective Capture 32C/D, Narrate 34C/D and Reflect 36C/D labels. Also appearing on this storyboard depiction is the Remaining Time 54 indicator which informs the Group they have only 13.5 remaining seconds. Considering this Group still has two Video Vignettes 30C, 30D to complete, they may foresee the possibility of eventually exceeding the Max Run Length. This realization may prompt the Group to either be hyper-conservative in preparing the remaining Soundless Previews 56C, 56D, or to re-trim one of both Soundless Previews 56A, 56B to free-up more time for the remaining Video Vignettes 30C, 30D.

Even after satisfactorily competing all Video Vignettes 30A-D, there still remains a few additional steps before the Video Project 24 can be submitted to the teacher as a fully completed assignment. Returning to FIG. 1, it can be seen that the system is configured to query 76 whether all assignments have been completed. In other words, for this Group, the question is whether all Jobs 32-36 for all Video Vignettes 30 been accomplished. If the answer to query 76 is "no," the Group is unable to proceed toward completion. They must go back and complete all Jobs 32-36. When the answer to query 76 is "yes," i.e., that all Jobs 32-36 for all Video Vignettes 30 are accomplished, the system is configured to query 78 whether the Remaining Time 54 is a non-negative number. So long at the Remaining Time 54 is greater than or equal to zero/null (0), the Group may proceed to function block 80. If the Remaining Time 54 is a negative number, the Group must re-trim 52 and re-narrate 68 one or more of the Soundless Previews 56 in order to satisfy query 78. Another possible query (not shown) could be included to determine whether all Key Terms 18 have been used at least once in the scripts 58A-D. If a Key Term 18 has not been used at least once in the narration, the Group will be unable to proceed toward completion of the Project. Naturally, these are only examples; other queries may be added to suit the teacher's needs.

Function block 80 enables the Group to change the default background music that will be automatically added to the Video Project in the final step. The system may, optionally, be configured with several choices of background music from which the Group may select. As background music is considered to be a pleasant flourish but not critical to the educational objectives, a default background musical score will be applied unless the Group specifically chooses a different song (assuming a choice is made available). Although students could be allowed to import any music selection and apply as background music, this would be expected to cause unnecessary distractions from the actual educational goals. Therefore, while customization is possible, it is believed most desirable to limit background music choices to a limited number of pre-defined, non-distracting background music selections.

Function block 82 represents the final step in the process of creating a Video Project 24. A corresponding button (not shown) on the GUI will be activated by the Group, which will cause the system to complete the Video Project 24 by compiling all of the Video Vignettes 30A-D into a single work. The plural Video Vignettes 30A-D are this aggregated to run end-to-end, in sequence (A-B-C-D), for grading and for presentation to unspecified abstract audiences 62. During this final step 82, the system will superimpose the background music 80 at a volume level below the average volume of the Student Narrations 68.

FIG. 6 depicts an exemplary teacher screen (GUI) that facilitates management of multiple groups concurrently working on the same assigned Project 24. The screen is arranged in matrix format. Each Group occupies a respective row. The several phases (30A-D) of the Project 24 occupy respective columns. And for each phase 30, the Jobs 32-36 are represented by icons. Capture 32 is a camera, Narrate 34 is a microphone and Reflect 36 is a star. These are illustrative examples only. The character of each Job icon will change in some intuitive manner upon completion by the Group so that in a glance the teacher can see the progress of each Group. For example, uncompleted Jobs 32-36 might be represented with icons appearing in light outline, whereas the completed Jobs 32-36 might be represented with icons appearing in full vivid color. A Final Video column in the matrix is devoted to project completion status. The exemplary icon representing Final Video status is shown as a film clapboard. Uncompleted Video Projects 24 will display a clapboard icon in light outline, whereas the completed Video Project 24 will display the clapboard icons in full vivid color. This matrix-style presentation will enable a teacher to quickly identify the status of each Group toward completion of a Final Video. The interface also provides a Feedback platform 84. At any point during the Project 24, the teacher can communicate with a selected Group by sending a communication via the Feedback feature 84. This Feedback feature 84 may also be used by the teacher to render a grade for the Project 24.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for reinforcing proficiency skills of a specified topic by teaching to an inanimate object through repetitive multi-modal cognitive stimulation using staged performances in combination with a multi-media system, the method comprising the steps of:

establishing a predetermined Max Run Time for a Video Project, curating at least first and second Video Vignettes for the Video Project, said step of curating the first Video Vignette comprising a first Capture Job and a first Narrate Job, the first Capture Job comprising the steps of: generating first raw video content by live-action video-recording a staged live-action performance about an assigned topic using a video camera device having a non-transitory camera storage medium, storing the first raw video content on the camera storage medium, designating at least a portion of the first raw video content as first Vignette Clips, the first Vignette Clips having a run time, transferring the first Vignette Clips to a non-transitory WIP Storage Medium, establishing an Unfinished Project Run Time as the run time of the first Vignette Clips in the WIP Storage Medium, reporting the mathematical difference between the Max Run Time and the Unfinished Project Run Time, altering the Unfinished Project Run Time by trimming the first Vignette Clips, disassociating any native audio content from the first Vignette Clips to create a first Soundless Preview, the first Narrate Job comprising the steps of: composing a first narration script for a first Soundless Preview, playing the first Soundless Preview on a Graphic User Interface while concurrently displaying the first narration script and reading aloud the first narration script to simulate a synchronized voice-over narration, storing in a non-transitory storage medium an audio recording of the first narration script in synchronicity with the first Soundless Preview to create a Narrated First Video Vignette, saving the Narrated First Video Vignette in the WIP Storage Medium, said step of curating the second Video Vignette comprising a second Capture Job and a second Narrate Job, the second Capture Job comprising the steps of: generating second raw video content by live-action video-recording a staged live-action performance about the assigned topic using a video camera device having a non-transitory camera storage medium, storing the second raw video content on the camera storage medium, designating at least a portion of the second raw video content as second Vignette Clips, the second Vignette Clips having a run time, transferring the second Vignette Clips to the non-transitory WIP Storage Medium, re-computing the Unfinished Project Run Time by summing of the run times of the first and second Vignette Clips in the WIP Storage Medium, reporting the mathematical difference between the Max Run Time and the re-computed Unfinished Project Run Time, disassociating any native audio content from the second Vignette Clips to create a second Soundless Preview, the second Narrate Job comprising the steps of: composing a second narration script for a second Soundless Preview, playing the second Soundless Preview on a Graphic User Interface while concurrently displaying the second narration script and reading aloud the second narration script to simulate a synchronized voice-over narration, adjusting at least one of the second narration script and the second Vignette Clips, storing in a non-transitory storage medium an audio recording of the second narration script in synchronicity with the second Soundless Preview to create a Narrated Second Video Vignette, saving the Narrated Second Video Vignette in the WIP Storage Medium, and aggregating the Narrated First Video Vignette and the Narrated Second Video Vignette to create a completed Video Project, said aggregating step being contingent upon the completion of all pre-determined tasks and the re-computed Unfinished Project Run Time being not greater than the Max Run Time, said step of creating a completed Video Project including superimposing background music at a volume level below the average volume of the first and second Student Narrations.

2. The method of claim 1, further including transferring the first and second raw video content from the camera storage medium to the non-transitory storage medium containing the audio recordings of the first and second narration scripts, the non-transitory storage medium containing the audio recordings of the first and second narration scripts comprising a non-transitory WIP Storage Medium.

3. The method of claim 1, wherein said step of curating the first Video Vignette further includes a first Reflect Job, the first Reflect Job comprising the step of completing at least one pre-determined task.

4. The method of claim 1, wherein the first Narrate Job further includes the step of adjusting at least one of the first narration script and the first Vignette Clips.

5. The method of claim 4, wherein the second Narrate Job includes the step of altering the re-computed Unfinished Project Run Time by trimming at least one of the first and second Vignette Clips.

6. The method of claim 1, wherein said step of curating the first Video Vignette includes a first Reflect Job, the first Reflect Job comprising the step of completing at least one pre-determined task, and said step of curating the second Video Vignette includes a second Reflect Job, the second Reflect Job comprising the step of completing at least one pre-determined task.

7. A system for reinforcing proficiency skills of a specified topic by teaching to an inanimate object through repetitive multi-modal cognitive stimulation using staged performances, the system including a non-transitory computer readable medium coded with instructions and executed by a processor to perform the steps of:

establishing a predetermined Max Run Time for a Video Project, curating at least first and second Video Vignettes for the Video Project, said step of curating the first Video Vignette comprising a first Capture Job and a first Narrate Job, the first Capture Job comprising the steps of: generating first raw video content by live-action video-recording a staged live-action performance about an assigned topic using a video camera device having a non-transitory camera storage medium, storing the first raw video content on the camera storage medium, designating at least a portion of the first raw video content as first Vignette Clips, the first Vignette Clips having a run time, transferring the first Vignette Clips to a non-transitory WIP Storage Medium, establishing an Unfinished Project Run Time as the run time of the first Vignette Clips in the WIP Storage Medium, reporting the mathematical difference between the Max Run Time and the Unfinished Project Run Time, altering the Unfinished Project Run Time by trimming the first Vignette Clips, disassociating any native audio content from the first Vignette Clips to create a first Soundless Preview, the first Narrate Job comprising the steps of: composing a first narration script for a first Soundless Preview, playing the first Soundless Preview on a Graphic User Interface while concurrently displaying the first narration script and reading aloud the first narration script to simulate a synchronized voice-over narration, storing in a non-transitory storage medium an audio recording of the first narration script in synchronicity with the first Soundless Preview to create a Narrated First Video Vignette, saving the Narrated First Video Vignette in the WIP Storage Medium, said step of curating the second Video Vignette comprising a second Capture Job and a second Narrate Job, the second Capture Job comprising the steps of: generating second raw video content by live-action video-recording a staged live-action performance about the assigned topic using a video camera device having a non-transitory camera storage medium, storing the second raw video content on the camera storage medium, designating at least a portion of the second raw video content as second Vignette Clips, the second Vignette Clips having a run time, transferring the second Vignette Clips to the non-transitory WIP Storage Medium, re-computing the Unfinished Project Run Time by summing of the run times of the first and second Vignette Clips in the WIP Storage Medium, reporting the mathematical difference between the Max Run Time and the re-computed Unfinished Project Run Time, disassociating any native audio content from the second Vignette Clips to create a second Soundless Preview, the second Narrate Job comprising the steps of: composing a second narration script for a second Soundless Preview, playing the second Soundless Preview on a Graphic User Interface while concurrently displaying the second narration script and reading aloud the second narration script to simulate a synchronized voice-over narration, adjusting at least one of the second narration script and the second Vignette Clips, storing in a non-transitory storage medium an audio recording of the second narration script in synchronicity with the second Soundless Preview to create a Narrated Second Video Vignette, saving the Narrated Second Video Vignette in the WIP Storage Medium, and aggregating the Narrated First Video Vignette and the Narrated Second Video Vignette to create a completed Video Project, said aggregating step being contingent upon the completion of all pre-determined tasks and the re-computed Unfinished Project Run Time being not greater than the Max Run Time, said step of creating a completed Video Project including superimposing background music at a volume level below the average volume of the first and second Student Narrations.

8. The system of claim 7, further including transferring the first and second raw video content from the camera storage medium to the non-transitory storage medium containing the audio recordings of the first and second narration scripts, the non-transitory storage medium containing the audio recordings of the first and second narration scripts comprising a non-transitory WIP Storage Medium.

9. The system of claim 7, wherein said step of curating the first Video Vignette further includes a first Reflect Job, the first Reflect Job comprising the step of completing at least one pre-determined task.

* * * * *